No. 739,204. Patented September 15, 1903.

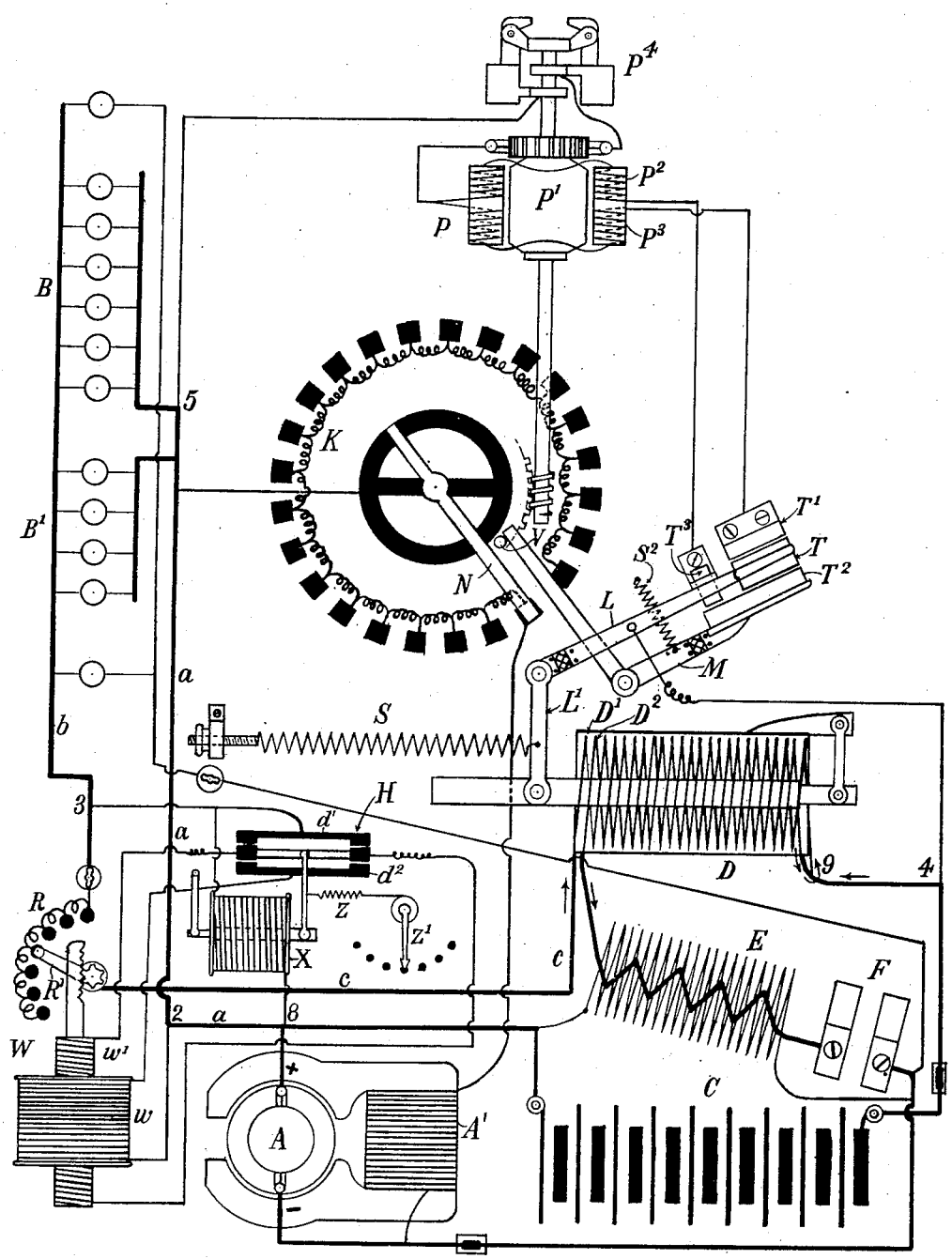

UNITED STATES PATENT OFFICE.

JAMES F. McELROY, OF ALBANY, NEW YORK, ASSIGNOR TO CONSOLIDATED CAR HEATING COMPANY, OF ALBANY, NEW YORK, A CORPORATION OF WEST VIRGINIA.

ELECTRIC-LIGHTING SYSTEM.

SPECIFICATION forming part of Letters Patent No. 739,204, dated September 15, 1903.

Application filed October 22, 1902. Serial No. 128,257. (No model.)

*To all whom it may concern:*

Be it known that I, JAMES F. McELROY, a citizen of the United States, residing at Albany, county of Albany, and State of New York, have invented certain new and useful Improvements in Electric-Lighting Systems, of which the following specification and accompanying drawing show that form which I now regard as the best out of the various forms in which the principles of the invention may be embodied.

My system is of the type in which the generator is driven at a variable and intermittent speed—as, for instance, by the axle of a railway-vehicle—and in which a storage battery is charged by the generator simultaneously with its operation of electric lamps or other translating devices in order that the battery may assume the lamp or other load of the generator whenever its speed falls below a certain rate or it stops altogether.

My improvement resides in means for maintaining a constant changing current in the battery and a variable current in the lamps corresponding to their variable number or degree of illumination. More particularly I employ as the determinant of regulation a magnet in the main circuit in series with both lamps and battery whose action is adjusted by means of a supplementary reversely-wound coil contained in the branch circuit leading to the lamps.

Referring to the drawing, A represents the armature, and A' the shunt field-magnet coil of a dynamo driven at a variable speed.

B and B' represent groups of electric lamps to be operated thereby, which indicate also any other kind of load on the machine.

C is a storage battery in multiple with the lamps. The lamps constitute a set or group of translating devices contained in one multiple-arc branch, and the battery-cells constitute a second set or group of translating devices contained in a different multiple-arc branch from the dynamo-circuit.

F is an automatic connection switch in the main unbranched portion of the circuit, designed to be operated by a compound shunt and series magnet E in a manner now well known in the art—that is, the switch is closed by the shunt-coil when the dynamo potential reaches a predetermined value and is opened by the series coil when the current therein (upon a drop in armature speed and potential) is reversed by the counter-pressure of the battery overcoming the weakened direct pressure of the dynamo. Such reversal of the series coil neutralizes the effect of the shunt-coil and allows the switch to open.

The lamp branch, starting from the plus brush of the dynamo, begins at branching point 8 and goes thence by wire $a$ to lamps B B', thence by wire $b$ to resistance R, and thence by wire $c$ to the reverse-coil D' of determining-magnet D. After passing through coil D' it meets the battery branch at the point 9 and together therewith goes through the main coil $D^2$ of said magnet to the series coil of switch-magnet E, to switch F, to the minus brush of the dynamo. The battery branch goes directly from said point 8 through the battery to said point 9.

From the foregoing it appears that the entire current from the dynamo goes through the main coil-magnet D and that the lamp portion goes through the reverse-coil D'. Remembering that magnet D is the determinant of regulation—that is, governs the regulator and determines when it is to act to either increase or decrease the strength of the dynamo—it is manifest that the differential effect of coil D' causes it to maintain a constant current in the battery branch and a variable current in the lamp branch of the circuit. Thus assuming all the lamps to be turned off, the magnet D, being in series with the dynamo and battery, will maintain in the circuit a constant current of the particular value for which it has been adjusted. Any departure from this value will cause the magnet to respond and set in operation the regulating apparatus, which in turn will correct the supposed departure by an increase or decrease of the current to its said normal value. If now a few of the lamps are turned on, the current flowing thereto will correspondingly weaken magnet D, so that it requires a larger current to make it respond, and such larger current becomes the normal amount which the magnet will maintain. If more lamps are added, the magnet will be further weakened and a still greater amount of current will be maintained in the circuit. The reverse operation takes place as the lamps are turned off. In this manner the amount of current in the circuit over and above the constant amount taken by the battery varies directly with the number of lamps or the amount of current in the lamp branch. It remains, however, to maintain a definite and proper pressure on the lamps, for in the arrangement as thus far described the pressure on the lamps is obviously the same as that applied to the battery, which is too high for the lamps and not entirely constant. Hence the resistance R, above mentioned, is included in the lamp branch in series with the lamps. This resistance reduces the pressure from that applied to the battery to the lower pressure required for the lamps, and is, moreover, automatically adjusted in amount, to avoid fluctuations in the lamp-pressure, by means of a motor W, which carries a rack, engaging a pinion on the contact-arm R' of the resistance. The stationary member of the motor is represented by the coil $w$ and its movable member by the coil $w'$, the former being in series with the latter in a shunt across the lamp branch circuit from the point 2 to the point 3. This motor-circuit contains a normally open reversing-switch H, controlling the direction of current in member $w'$, and in turn controlled by a magnet X, shunting the lamps and measuring the pressure applied thereto. So long as this pressure is normal the magnet X maintains switch H open, with no current in motor W. If, however, the pressure departs from the normal, either up or down, the magnet closes switch H and admits current in one direction or the other to $w'$, whence it passes through $w$, and the motor being thus energized acts to increase or decrease resistance R, so as to restore the lamp-pressure to its normal value.

The dynamo-regulator, which is dominated, as aforesaid, by the magnet D, forms no part of my present invention and may be of any desired type appropriate for the purpose. I, however, show a regulator such as I have heretofore used with success. In this regulator K is a rheostat or resistance in series with the shunt field-magnet A' of the dynamo and serving to adjust by its greater or less amount the field-magnet current, and in consequence the dynamo strength. The rheostat contact-arm N is operated by a motor P, whose field-magnet carries two oppositely-wound coils $P^2$ and $P^3$, both in series with the armature P' and contained in a circuit from the storage battery C, which circuit is controlled by a centrifugal governor $P^4$, that serves to open it when the motor speed becomes too great. This circuit is also controlled by the magnet D, which closes it through one or the other of the differential coils $P^2$ and $P^3$ to give the motor a corresponding direction of rotation, and thereby introduce into or withdraw from the field-magnet circuit of the dynamo more or less of resistance K, according as the magnet D finds that the current is too great or too small. To this end the horizontal core of magnet D, drawing against retractile spring S, operates an angle-lever L L', whose outer end carries a contact-block T, that when the current in the magnet is normal stands midway between the contacts T' and $T^2$, connected, respectively, to the oppositely-wound coils $P^2$ and $P^3$ of motor P. The block T is connected to one side of the battery-circuit by a wire leading from the point 4, while the opposite terminal of the motor-circuit joins the battery-circuit at the point 5. So when the current in the circuit as determined or measured by magnet D is too great or too small the block T is brought into contact with block T' or $T^2$, and the motor P thereby energized in a direction to increase or decrease the amount of resistance R in the dynamo field-magnet circuit for the purpose of decreasing or increasing the power of the dynamo. The wire from motor field-coil $P^2$ is connected to block $T^2$, through an intermediate contact $T^3$, which is opened whenever the regulator comes to its "off" position, (the one shown in the drawing,) and all of the resistance R is therefore removed from the dynamo field-magnet circuit. For this purpose the block $T^2$ is mounted on one end of an angle-lever M, whose opposite end is engaged by the pin V in the rheostat when it (the rheostat) comes to rest in its off position. This separates at that moment the block $T^2$ from the block $T^3$, and opens the circuit there, as aforesaid. When the rheostat starts again, the arm M is released and the spring $S^2$ again closes the circuit. By this means the motor, because it is worked from the battery, is more certain to complete the run of the rheostat to the off position in such an event as the blowing of a fuse in the main circuit or under other conditions, while on the other hand the motor is not allowed to remain indefinitely with its circuit from the battery closed after the operation of the apparatus ceases. If this were permitted, a constant drain on the battery would ensue that might more or less exhaust it.

Much of the apparatus herein disclosed is already shown and claimed in other applications, and the present case is designed to cover only the manner of disposing the regulation-determining magnet, as above described.

What I claim as new, and desire to secure by Letters Patent, is—

1. In an electrical system the combination with a dynamo, of lamps and a storage battery connected thereto in separate multiple-arc branches respectively, a regulator for the dynamo, and a governing-magnet for the regulator in series with both battery and lamps and provided with a differential coil in the branch circuit leading to the lamps.

2. In an electrical system, the combination with a variable-speed dynamo of lamps and a storage battery in separate multiple-arc branches respectively, an automatic connection switch in the main circuit, a regulator for the dynamo, and a governing-magnet for the regulator in series with both battery and lamps and provided with a differential coil in the branch circuit leading to the lamps.

3. In an electrical system, the combination with a dynamo of translating devices in separate multiple-arc branches, one carrying a constant and the other a variable current, a regulator for the dynamo, and a governing-magnet for the regulator in series with both branches and provided with an opposing coil in the variable-current branch of the circuit.

4. In a train-lighting system, the combination with a variable-speed dynamo driven by an axle, of two sets of electric translating devices, supplied by the dynamo, each set being in a separate multiple-arc branch therefrom, a regulator for the dynamo, a magnet controlling the regulator and responding to the current needs of both branches, and a modifying-coil for said magnet, in series with one of said sets of translating devices, and wound on the same core therewith.

5. In a train-lighting system, the combination with a variable-speed dynamo, of electric lamps and a storage battery in separate multiple-arc branches respectively, a regulator for the dynamo, a magnet controlling the regulation and responding to the demands of both branches, and a modifying-coil for said magnet in series with one of the branches and wound on the same core therewith.

In witness whereof I have hereunto set my hand, before two subscribing witnesses, this 17th day of October, 1902.

JAMES F. McELROY.

Witnesses:
   BEULAH CARLE,
   WILLIAM A. MORRILL, Jr.